United States Patent
Nakamura

(10) Patent No.: US 11,082,579 B2
(45) Date of Patent: Aug. 3, 2021

(54) INFORMATION PROCESSING APPARATUS, METHOD OF CONTROLLING INFORMATION PROCESSING APPARATUS AND NON-TRANSITORY COMPUTER-READABLE MEDIUM STORING PROGRAM

(71) Applicant: SHARP KABUSHIKI KAISHA, Sakai (JP)

(72) Inventor: Hiroaki Nakamura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/869,121

(22) Filed: May 7, 2020

(65) Prior Publication Data
US 2020/0358921 A1 Nov. 12, 2020

(30) Foreign Application Priority Data
May 10, 2019 (JP) .............................. JP2019-089878

(51) Int. Cl.
*G06F 3/12* (2006.01)
*H04N 1/32* (2006.01)
*H04N 1/00* (2006.01)

(52) U.S. Cl.
CPC ..... *H04N 1/32128* (2013.01); *H04N 1/00403* (2013.01); *H04N 1/32096* (2013.01)

(58) Field of Classification Search
CPC .......... H04N 1/32128; H04N 1/00403; H04N 1/32096
See application file for complete search history.

(56) References Cited

U.S. PATENT DOCUMENTS

| | | | | |
|---|---|---|---|---|
| 6,072,599 A * | 6/2000 | Oba | ............... | H04N 1/00204 358/400 |
| 6,701,095 B1 * | 3/2004 | Fujimoto | ............ | G06F 11/0733 399/18 |
| 2007/0061145 A1 * | 3/2007 | Edgington | ............ | G10L 13/027 704/262 |
| 2007/0133543 A1 * | 6/2007 | Kawasaki | .......... | H04N 1/32064 370/392 |

FOREIGN PATENT DOCUMENTS

JP H02-153659 A 6/1990

* cited by examiner

*Primary Examiner* — Moustapha Diaby
(74) *Attorney, Agent, or Firm* — ScienBiziP, P.C.

(57) ABSTRACT

An information processing apparatus includes a memory, a determiner, a transmitter, and a voice output unit. The memory stores destination information including information related to a name. The determiner determines a receiver based on the destination information. The transmitter transmits data to the determined receiver. The voice output unit outputs a voice based on the information related to a name corresponding to the receiver when the receiver is determined by the determiner.

11 Claims, 15 Drawing Sheets

FIG. 3

| REGISTERED INFORMATION NUMBER | REGISTERED ITEM | ADDRESS BOOK REGISTRATION | | | |
|---|---|---|---|---|---|
| 1-1 | REGISTRATION NUMBER | 01 | 02 | 03 | 04 |
| 1-2 | DESTINATION NAME | ABC PART | BC REPAIR INC. | BS RESTAURANT | |
| 1-3 | CALL NUMBER/ ADDRESS | 03 0123 4567 | 06 789 0123 | 092 345 6789 | |
| 1-4 | DESCRIPTION OF DESTINATION 1 | PARTS COMPANY | REPAIR SHOP | LUNCH DELIVERY | |
| 1-5 | DESCRIPTION OF DESTINATION 2 (VOICE) | "PARTS COMPANY IN TOKYO" | "REPAIR SHOP IN OSAKA" | "ORDER LUNCH DELIVERY" | |

FIG. 4

| REGISTERED INFORMATION NUMBER | MESSAGE |
|---|---|
| 1-2 | BC REPAIR INC. |
| 1-4 | REPAIR SHOP |
| 1-5 | "REPAIR SHOP IN OSAKA" |

FIG. 8

| HISTORY INFORMATION | | | |
|---|---|---|---|
| CURRENT TIME AND DATE | DESTINATION | TRANSMISSION TIME AND DATE | RESULT (ERROR) |
| 2018/3/19    13:43 | | | |
| | REGISTRATION NUMBER 01 | 2018/3/16    13:10 | NORMAL COMPLETION |
| | | 2018/3/16    8:30 | BUSY LINE |
| | | 2018/3/15    10:30 | INTERRUPTED |
| | | 2018/3/14    15:00 | INTERRUPTED |
| CHANGE REGISTERED ADDRESS | | 2018/3/13    8:30 | |
| | | 2018/3/12    13:50 | BUSY LINE |
| | | 2018/3/9    10:15 | BUSY LINE |
| | | 2018/3/7    9:55 | NORMAL COMPLETION |
| | | 2018/3/2    14:25 | NORMAL COMPLETION |
| | | 2018/2/28    11:35 | NORMAL COMPLETION |
| | | 2018/2/10    9:48 | BUSY LINE |

FIG. 9

| COUNT INFORMATION NUMBER | COUNTING PERIOD | NUMBER OF TRANSMISSIONS |
|---|---|---|
| 2-1 | MORNING/AFTERNOON OF TODAY | 1 |
| 2-2 | YESTERDAY | 1 |
| 2-3 | THIS WEEK | 5 |
| 2-4 | THIS MONTH | 8 |
| 2-5 | THIS YEAR | 10 |
| 2-6 | AFTER ADDRESS UPDATE | 2 |

FIG. 10

| COUNT INFORMATION NUMBER | VOICE INFORMATION (EXAMPLE) |
|---|---|
| 2-1 | "THIS IS THE SECOND TRANSMISSION TODAY." "THIS IS THE FIRST TRANSMISSION THIS AFTERNOON." |
| 2-2 | "THIS MESSAGE WAS ALSO SENT YESTERDAY." "THIS MESSAGE WAS SENT ONCE YESTERDAY." |
| 2-3 | "THIS IS THE SIXTH TRANSMISSION OF THIS WEEK." |
| 2-4 | "THIS IS THE EIGHTH TRANSMISSION OF THIS WEEK." |
| 2-5 | "THIS IS THE TENTH TRANSMISSION OF THIS WEEK." |
| 2-6 | "THIS IS THE THIRD TRANSMISSION SINCE THE ADDRESS HAS BEEN UPDATED." "THIS IS THE FIRST TRANSMISSION AFTER THE ADDRESS HAS BEEN UPDATED." |

FIG. 11

| TRANSMISSION INTERVAL INFORMATION | TRANSMISSION INTERVAL | TRANSMISSION INTERVAL |
|---|---|---|
| 3 | CURRENT TIME TO LAST TRANSMISSION | 3 DAYS 0 HOURS |
| | LAST TRANSMISSION TO SECOND-TO-LAST TRANSMISSIONS BEFORE | 0 DAYS 4 HOURS |
| | SECOND-TO-LAST TRANSMISSION TO THIRD-TO-LAST TRANSMISSION | 0 DAYS 22 HOURS |
| | THIRD-TO-LAST TRANSMISSION TO FOURTH-TO-LAST TRANSMISSION | 0 DAYS 20 HOURS |

FIG. 12

| TRANSMISSION INTERVAL INFORMATION | VOICE INFORMATION (EXAMPLE) |
|---|---|
| 3 | "THIS IS THE FIRST TRANSMISSION IN THREE DAYS." "IT HAS BEEN THREE DAYS SINCE THE LAST TRANSMISSION." |

FIG. 14

| TRANSMISSION RESULT INFORMATION | TRANSMISSION RESULT (BY TIME PERIOD) | NORMAL COMPLETION | BUSY LINE | INTERRUPTED |
|---|---|---|---|---|
| 4-1 | YESTERDAY | 1 | 1 | 0 |
| 4-2 | THIS WEEK | 1 | 2 | 2 |
| 4-3 | THIS MONTH | 3 | 3 | 2 |
| 4-4 | THIS YEAR | 4 | 4 | 2 |
| 4-5 | AFTER ADDRESS UPDATE | 1 | 1 | 0 |

FIG. 15

| TRANSMISSION INTERVAL INFORMATION | VOICE INFORMATION (EXAMPLE) |
|---|---|
| 4-1 | "THERE WAS A BUSY LINE YESTERDAY." "YESTERDAY'S TRANSMISSION WAS NORMALLY COMPLETED." |
| 4-2 | "THERE WERE SUCCESSFUL TRANSMISSIONS AND UNSUCCESSFUL TRANSMISSIONS THIS WEEK." "THIS WEEK'S TRANSMISSIONS WERE ALL SUCCESSFUL." |
| 4-3 | "THIS MONTH, THERE WERE NORMAL COMPLETIONS, BUSY LINES, AND INTERRUPTIONS." |
| 4-4 | "THERE WERE FOUR SUCCESSFUL TRANSMISSIONS THIS YEAR." |
| 4-5 | "ALL TRANSMISSIONS AFTER THE ADDRESS UPDATE WERE SUCCESSFUL, EXCEPT FOR BUSY LINES." |

INFORMATION PROCESSING APPARATUS, METHOD OF CONTROLLING INFORMATION PROCESSING APPARATUS AND NON-TRANSITORY COMPUTER-READABLE MEDIUM STORING PROGRAM

This Nonprovisional application claims priority under 35 U.S.C. § 119(a) on Patent Application No. 2019-89878 filed in Japan on 10 May 2019, the entire contents of which are hereby incorporated by reference.

BACKGROUND OF THE INVENTION

Field of the Invention

The present invention relates to an information processing apparatus and the like, in particular, to an information processing apparatus that outputs a message to a user by voice.

Description of the Background Art

In an information processing apparatuses, such as multi-function peripherals, there is known erroneous transmission prevention function that prompts an operator to confirm the destination input by the operator in order to prevent erroneous transmission due to wrong input of a destination address.

For example, Japanese Unexamined Patent Publication No. 2-153659 discloses a facsimile machine that automatically makes a call to a destination number stored in a dial memory in response to a dial operation. The facsimile machine includes a microprocessor and an audio circuit, wherein the microprocessor receives the destination number stored in the dial memory as input data and outputs audio data corresponding to the destination number and wherein the audio circuit converts the audio data from the microprocessor to voice corresponding to the destination number and outputs the voice.

Japanese Unexamined Patent Publication No. 2-153659 describes a technique in which a destination number input by the operator is output in the form of a voice so as to allow the operator to audibly confirmed the destination number. However, when the destination number is output in the form of a voice, the destination number may be misheard by the operator more often than when the name of the destination or a description of the destination is output in the form of a voice. As a result, it is difficult for the operator to readily determine whether the destination number is that of the destination intended by the operator.

That is, there is a need for a technique that allows the operator to readily determine whether a number or address input by the operator is that of the destination intended by the operator.

SUMMARY OF THE INVENTION

An information processing apparatus according to an aspect of the present invention includes a memory, a determiner, a transmitter, and a voice output unit. The memory stores destination information including information related to a name. The determiner determines a receiver based on the destination information. The transmitter transmits data to the determined receiver. The voice output unit outputs a voice based on the information related to a name corresponding to the receiver when the receiver is determined by the determiner.

A method of controlling an information processing apparatus according to an aspect of the present invention includes determining a receiver based on destination information including information related to a name; and outputting a voice based on the information related to the name corresponding to the receiver when the receiver is determined.

A non-transitory computer-readable medium that stores therein a program for operating an image forming apparatus according to an aspect of the present invention, the program causing a computer of the image forming apparatus to execute a process including determining a receiver based on destination information including information related to a name; and outputting a voice based on the information related to the name corresponding to the receiver when the receiver is determined.

According to the present invention, the operator can readily determine whether a destination input by the operator is the correct receiver and erroneous transmission can be prevented.

BRIEF DESCRIPTION OF THE DRAWINGS

FIG. 3 is an example of a destination information table 112 of the information processing apparatus 1 according to the first embodiment;

FIG. 4 illustrates an example of a message table 118 of the information processing apparatus 1 according to the first embodiment;

FIG. 8 illustrates an example of a transmission history information table 114 of the information processing apparatus 2 according to any one of the second to fourth embodiments of the present invention;

FIG. 9 illustrates an example of a collected information table 116 of the information processing apparatus 2 according to the second embodiment;

FIG. 10 illustrates an example of a message table 118 of the information processing apparatus 2 according to the second embodiment;

FIG. 11 illustrates an example of a collected information table 116 of the information processing apparatus 2 according to the third embodiment;

FIG. 12 is an example of a message table 118 of the information processing apparatus 2 according to the third embodiment;

FIG. 14 illustrates an example of a collected information table 116 of an information processing apparatus 2 according to the present invention; and FIG. 15 illustrates an example of a message table 118 of the information processing apparatus 2 according to the fourth embodiment.

DESCRIPTION OF THE PREFERRED EMBODIMENTS

1. First Embodiment

1.1 Functional Configuration

Figure 1:
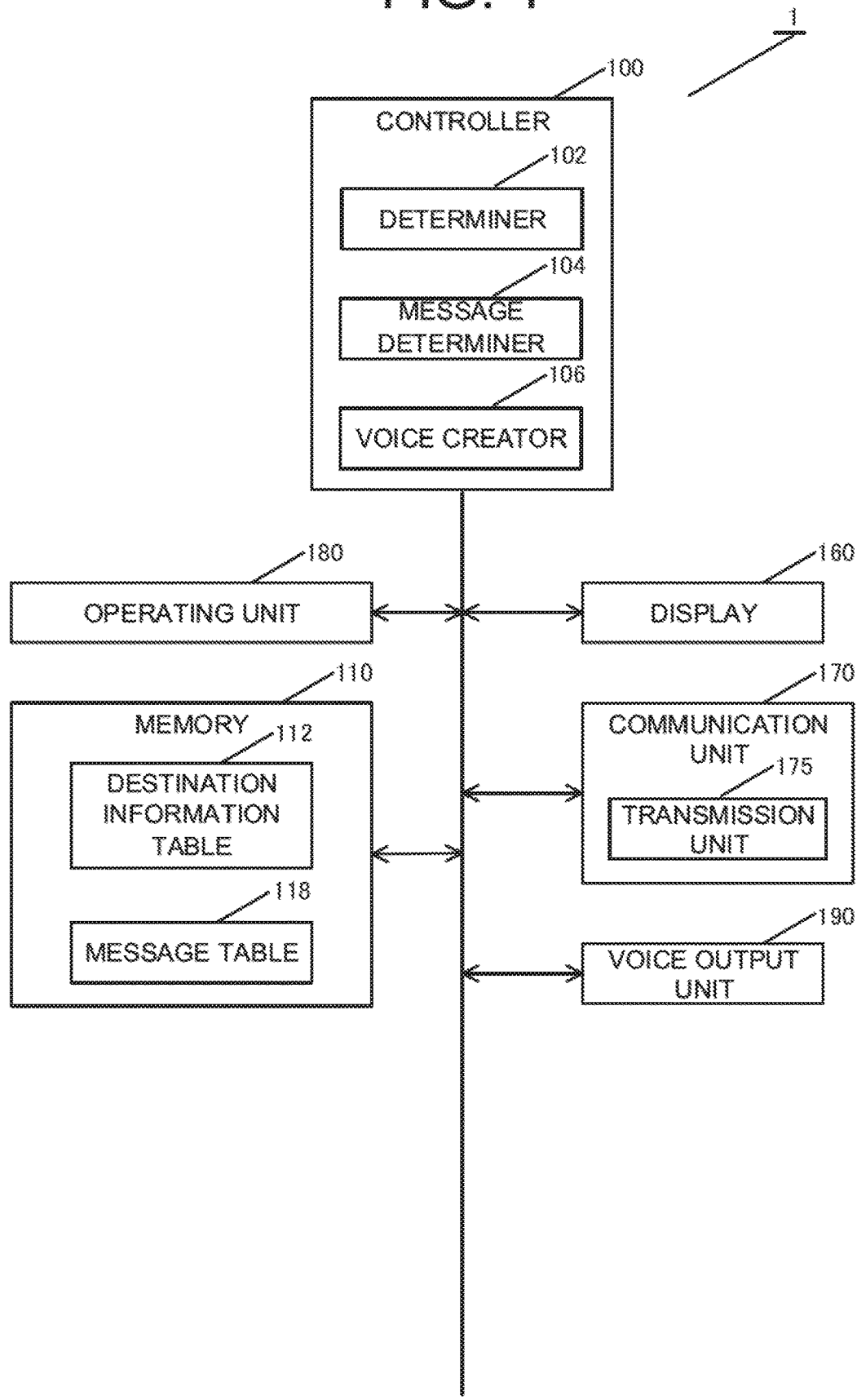
FIG. 1 is a block diagram illustrating the configuration of an information processing apparatus 1.

An embodiment of the present invention will now be described with reference to the accompanying drawings. FIG. 1 is a block diagram illustrating the configuration of an information processing apparatus 1. The information processing apparatus 1 includes a controller 100, a memory 110, a display 160, an operating unit 180, a communication unit 170, and a voice output unit 190.

The controller 100 is a functional section for comprehensive control of the information processing apparatus 1. The controller 100 reads and executes various programs stored in the memory 110, to provide various functions. The controller 100 includes, for example, a central processing unit (CPU) and the like.

The controller 100 functions as a determiner 102. The determiner 102 determines, on the basis of destination information stored in a destination information table 112 (see FIG. 3) of the memory 110, a receiver of an image including a facsimile message or information including an e-mail text.

The controller 100 also functions as a message determiner 104. The message determiner 104 determines a message on the basis of the destination information in the destination information table 112 and a message table 118 (see FIG. 4).

The controller 100 also functions as a voice creator 106. The voice creator 106 converts the message determined by the message determiner 104 into a voice. More specifically, an audio file is created from a text file corresponding to the message, and the audio file is output from the voice output unit 190.

Here, the term "destination" fundamentally refers to a facsimile number or an e-mail address when the controller 100 functions as the determiner 102 or the message determiner 104. The destination may refer to a facsimile number or an e-mail address and a name linked to the facsimile number or the e-mail address. The destination is defined as a receiver when a transmitter 175 described below reaches the stage of transmission. The destination or information used in the preparation period of transmission to be performed by each functional section of the information processing apparatus 1 is defined as a receiver. For example, the information stored in the memory 110 is the referred to as a "destination" during a period other than the preparation period for transmission.

The memory 110 is a functional section storing various programs and various types of data used for the operation of the information processing apparatus 1. The memory 110 includes, for example, a solid-state drive (SSD), a semiconductor memory, or a hard disk drive (HDD). The memory 110 may be configured as an external storage device on a network. The memory 110 stores the destination information table 112 and the message table 118.

As illustrated in FIG. 3, the destination information table 112 stores destination information including destinations and additional information related to the destinations. The additional information is, for example, descriptions of the destinations. The determiner 102 determines a destination to be a receiver. The additional information related to the destination is information related to the name of the destination. The additional information includes, for example, information referred to as the "destination description". The destination description includes, for example, business type and location. The information processing apparatus 1 sends and receives facsimile messages or e-mails on the basis of the destination information in the destination information table 112.

As illustrated in FIG. 4, the message table 118 is a list of messages corresponding to each destination to be output in the form of a voice by the voice output unit 190.

The message determiner 104 selects the additional information regarding the destination to be used for a message among the additional information in the destination information table 112. The additional information is information related the name of the receiver. The message determiner 104 then determines a message on the basis of the selected additional information regarding the destination.

The display 160 is a functional section for displaying an operation guide of the information processing apparatus 1 for the operator, various types of content to be used, the status and changes in the status of each section of the information processing apparatus 1. For example, the display 160 includes a liquid crystal display (LCD) or an organic electroluminescent (EL) display.

The operating unit 180 is a functional section of the information processing apparatus 1 for receiving an input of, for example, the destination through an operation by the operator. For example, the operating unit 180 may include a software key or a hardware key realized by a touch screen integrated with the display 160. The operating unit 180 may be realized by an external device, such as an external keyboard or a mouse.

The communication unit 170 is a functional section for connecting the information processing apparatus 1 to a network NW or a telephone line. The controller 100 inputs and outputs data to and from the information processing apparatus 1 through the communication unit 170. The communication unit 170 can be connected to a network NW via a mobile communication network, such as Long-Term Evolution (LTE) or 5th Generation 5G), a wireless LAN, such as Wi-Fi, or a wired LAN, or a telephone line for facsimile transmission/reception. The communication unit 170 includes the transmitter 175 for data output from the information processing apparatus 1. The destination used as information for a facsimile transmission or an e-mail transmission by the transmitter 175 is defined as a "receiver".

The voice output unit 190 is a functional section for enabling output of voice, alarm sound, music, and the like. For example, the voice output unit 190 includes a speaker and an external output terminal that can be coupled to an external speaker. Alternatively, the voice output unit 190 may include a wireless speaker using a wireless communication function.

1.2 Process Flow

The flow illustrated in FIG. 2 will now be described with reference to the destination information table 112 in FIG. 3 and the message table 118 in FIG. 4.

Figure 2:
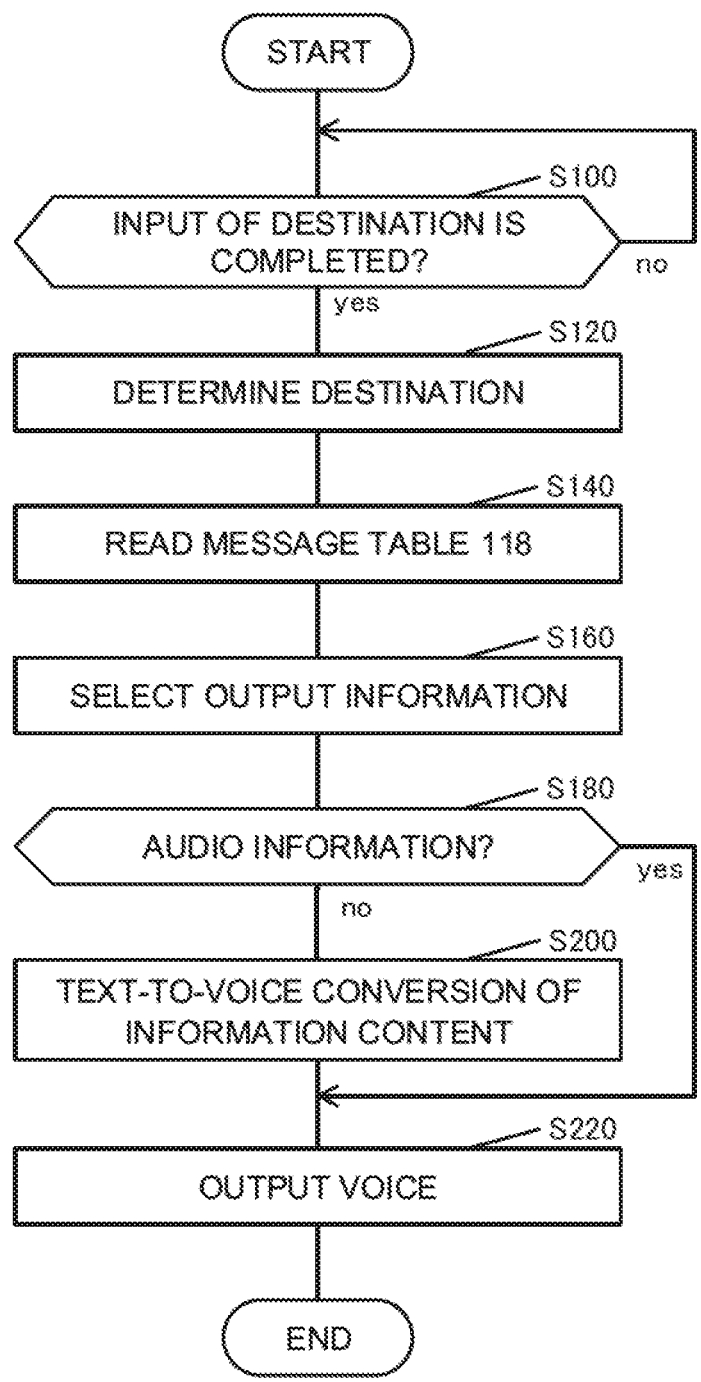
FIG. 2 is a flowchart illustrating a process by the information processing apparatus 1 according to a first embodiment.

In the flow illustrated in FIG. 2, while the operator is inputting the facsimile number "0678 . . . " of the destination through the operating unit 180 for facsimile transmission from the information processing apparatus 1, the process returns to the start because input of the destination is not complete (step S100: no).

When the input of the facsimile number "067890123" is completed, the determiner 102 determines that facsimile number corresponds to "registration number 02: BC Repair Inc" in the destination information table 112 in FIG. 3 and determines that the receiver is "BC Repair Inc" (step S120). The controller 100 retrieves the message table 118 corresponding to the registration number 02, as illustrated in FIG. 4 (step S140).

The message table 118 illustrated in FIG. 4 corresponding to the registration number 02 in FIG. 3 stores three voice output candidates for the destination name, the destination description 1, and the destination description 2. The message determiner 104 randomly determines any one of the destination name, the destination description 1, and the destination description 2 to be the additional information. For example, in this case, the message determiner 104 randomly determines the destination description 1 to be the additional information (step S160).

The destination description 1; "repair shop", which is the additional information, is not audio information (step S180: no). Therefore, the process proceeds to step S200. The voice creator 106 creates an audio file, as audio information, corresponding to "repair shop" in the form of a voice (step S200). The voice output unit 190 outputs the audio information of the audio file of "repair shop" in the form of a voice (step S220).

Note that, in the case where the message determiner 104 determines the message to be the destination name, the voice output unit 190 outputs the destination name in the form of a voice. In the case where the message determiner 104 determines the message to be the destination description 1 or 2, the voice output unit 190 may output only the destination description 1 or 2 in the form of a voice because the destination number or the destination name are displayed on the touch screen of the operating unit 180. However, the actual destination may be unclear when only the destination description 1 or 2 is output in the form of a voice. Therefore, the voice output unit 190 may output the destination name in the form of a voice and then output the destination description 1 or 2 in the form of a voice.

1.3 Advantageous Effects

According to this embodiment, the voice output unit 190 outputs information related to the destination in the form of a voice and does not output the actual number input by the operator for the facsimile transmission. The operator can readily identify the destination. The information output from the voice output unit 190 is not limited to the actual destination.

Every time the voice output unit 190 outputs information including the destination description 1 or 2, the voice output unit 190 may change the information to be output. By changing the information output every time, the voice output unit 190 can attracts the attention of the operator and thereby prevent erroneously transmission by the operator.

2. Second Embodiment

An information processing apparatus 2 according to the second embodiment has the same configuration as that of the information processing apparatus 1 according to the first embodiment, except for further including a history manager 113. The information processing apparatus 2 creates a message on the basis of history information in a history information table 114 managed by the history manager 113. The message determiner 104 creates a message to be output from the voice output unit 190 in the form of audio information, on the basis of the history information in the history information table 114. This embodiment provides an increased number of message options to be selected by the message determiner 104. In the second embodiment, the points different from the first embodiment will mainly be described, and the description of the common parts will be omitted.

2.1 Functional Configuration

Figure 5:
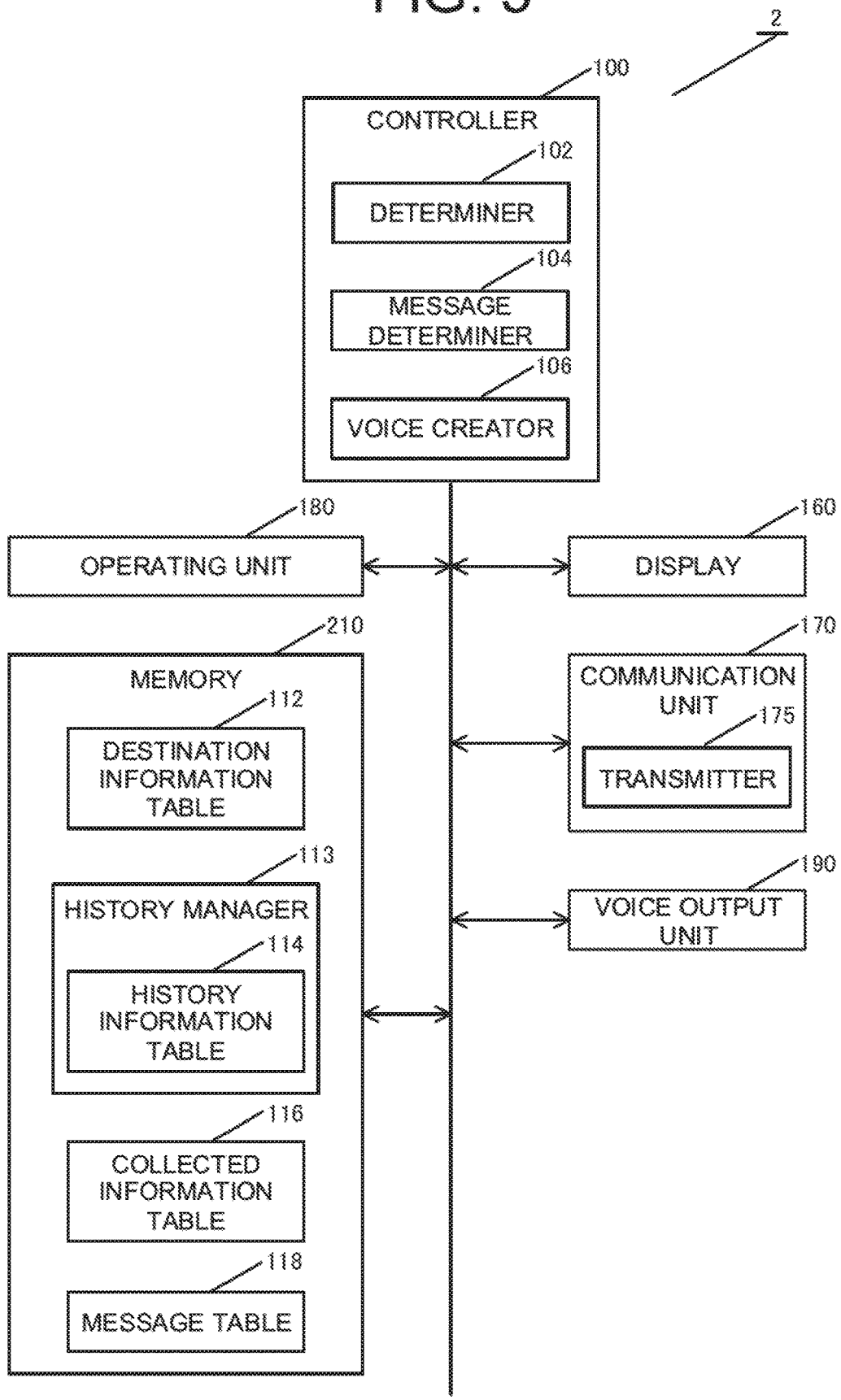
FIG. 5 is a block diagram illustrating the configuration of an information processing apparatus 2.

The information processing apparatus 2 according to the second embodiment has the same configuration as that of the information processing apparatus 1 according to the first embodiment, except for including a memory 210 as illustrated block diagram in FIG. 5. The memory 210 stores a history information table 114 managed by a history manager 113 and a collected information table 116. In some cases, the message determined by the message determiner 104 on the basis of additional information in the first embodiment may simply be referred to as a "message" in the second embodiment. The message is the source of the audio information created by the voice creator 106.

A history information table 114 managed by the history manager 113 stores the history of facsimile transmission or e-mail transmission with each destination, as illustrated FIG. 8. The controller 100 creates a history information table 114 for each destination. The controller 100 stores, in the history information table 114, information on when a facsimile message or an e-mail has been sent to the destination. When the transmitter 175 performs actual transmission with a destination, the controller 100 updates the history information table 114 of the history manager 113 by adding a new record including information on the date and time of transmission and the transmission status.

The history information table 114 stores the history of transmissions. Since a message is output from the voice output unit 190 in the form of a voice before transmission, the transmission and the voice output of the message basically have a one-to-one correspondence even if there is a time lag of one or two minutes between the transmission and the voice output of the message. Therefore, the transmission and the voice output of the message may be considered as a series of events.

As illustrated in FIG. 9, a collected information table 116 is a temporarily created table for storing a collection of information on transmissions with a specific destination retrieved by the message determiner 104 from the history information table 114. The message determiner 104, for example, counts the numbers of transmissions with the specific destination in predetermined periods, such as per week, per month, and per year, and creates a collected information table 116 storing these numbers. After the message has been determined and the transmitter 175 has actually made a transmission to the destination, there is no need to keep the collected information table 116. Therefore, the collected information table 116 is deleted.

In the second embodiment, the message determiner 104 stores the determined message in the message table 118. On the basis of the stored in the message table 118 by the message determiner 104, the voice output unit 190 outputs the message in the form of a voice. After the message has been output, the message determiner 104 refers the message table 118 to determine the information to be used as the source of the next message. That is, the message table 118 according to the second embodiment stores the history of the output message.

2.2 Process Flow

Figure 6:
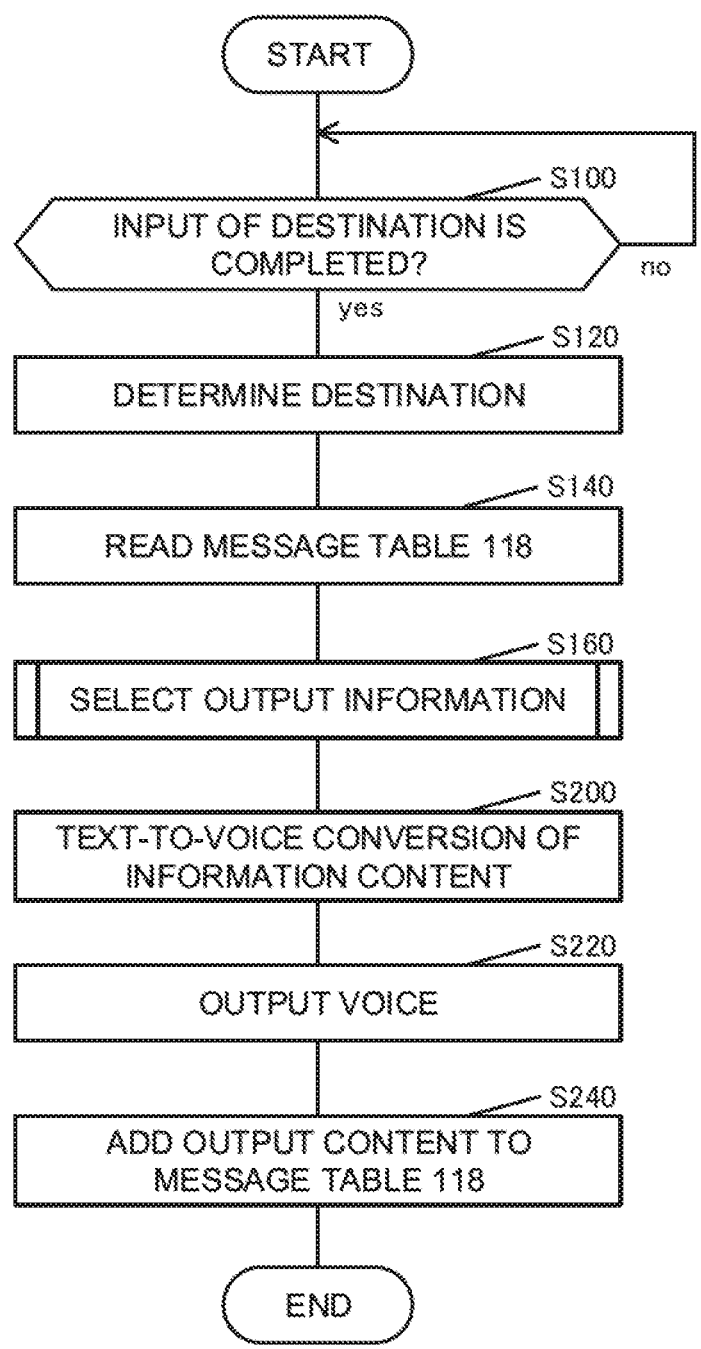
FIG. 6 is a flowchart illustrating a process by the information processing apparatus 2 according to the second or third embodiment.

FIG. 6 is a flowchart according to the second embodiment. The process performed in step S160 is more complicated than that in the first embodiment. A process for determining a message is illustrated in the flowchart in FIG. 7.

In the second embodiment, the message determined by the message determiner 104 in step S160 is not audio information prepared in advance. The voice creator 106 always converts the message to a voice in step S200. Alternatively, the message determiner 104 may serve as the voice creator 106 and convert the message to a voice.

The message determiner 104 stores the message determined in step S240 in the message table 118.

The selection of output information in step S160 will be described with reference to the flowchart in FIG. 7. In the following description, the history information table 114 and the message table 118 in step S120 refer to the history information table 114 and the message table 118, respectively, for the destination or the receiver determined by the determiner 102. The message determiner 104 creates the collected information table 116 based on the history information table 114. FIG. 8 illustrates an example of a history information table 114. FIG. 9 illustrates an example of a collected information table 116. FIG. 10 illustrates an example of a message table 118.

Figure 7:
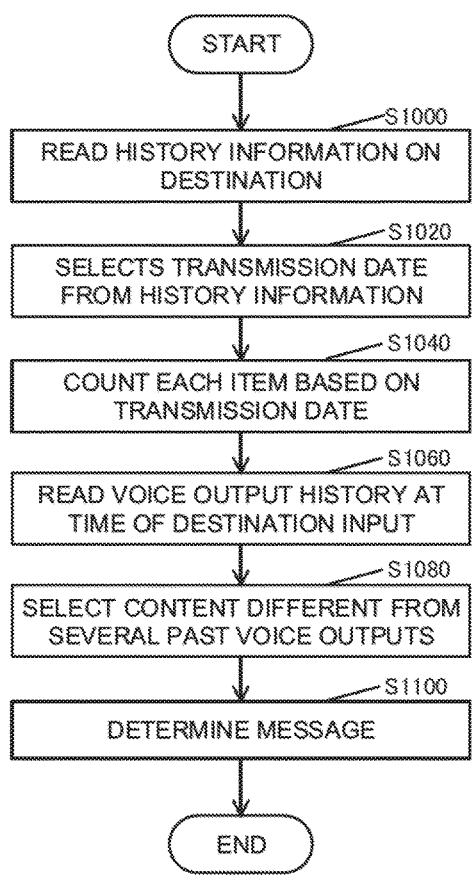
FIG. 7 is a flowchart illustrating a process by the information processing apparatus 2 according to the second or third embodiment.

As illustrated in FIG. 7, the message determiner 104 retrieves history information from the history information table 114 illustrated FIG. 8 (step S1000). The message determiner 104 reads the transmission date and time from the retrieved history information (step S1020).

Further descriptions will be made with reference to FIGS. 8, 9, and 10. As an example, the transmission operation at the transmission date and time "2018/3/16 13:10" in the history information table 114 illustrated in FIG. 8 will be described.

With reference to the history information table 114 in FIG. 8, a transmission at "2018/3/16 8:30" has been recorded before the transmission at "2018/3/16 16 13:10". In step S1040, the message determiner 104 creates a collected information table 116 as illustrated in FIG. 9.

That is, the message determiner 104 has counted the transmission at "2018/3/16 8:30" in the history information table 114 in FIG. 8 as one transmission in collected information table 116 in FIG. 9 in the count information number 2-1 row corresponding to the counting period "morning/afternoon of today".

The message determiner 104 then retrieves the message table 118 illustrated in FIG. 10 in step S1060. The message table 118 in FIG. 10 shows example of voice information determined by the message determiner 104 corresponding to the number of transmissions of counting periods, each of which corresponds count information number 2-1 to 2-6 respectively. The message table 118 shows, in the count information number 2-1 row, example of voice information of which content is based on the number of transmission: "1" counting period: "yesterday" shown in FIG. 9. Further, the message table 118 shows, in the count information number 2-3 row, example voice information of which content is based on the number of transmission: "5" counting period: "this week" in the collected information table 116 in FIG. 9

The message determiner 104 reads voice output history in step S1060, by checking them, in case that the message determiner 104 has not selected voice information of which content is based on the counting period "morning/afternoon of today" corresponding to the count information number 2-1 in the past several transmissions, then in step S1080, the message determiner 104 selects the count information number 2-1 corresponding to the counting period "morning/afternoon of today".

The count information number 2-1 in FIG. 9 shows that number of transmission is "1", the transmission operation at the transmission date and time "2018/3/16 13:10" is the second transmission to be made after the latest transmission made in the morning. The message determiner 104 determines, for example, "This is the second transmission today" or "This is the first transmission this afternoon" (step S1100). Note that, in step S200, the voice creator 106 creates an audio file of the voices by converting the destination determined by the determiner 102 to a voice and the message determined in step S1100 to a voice following the destination.

2.3 Advantageous Effects

According to this embodiment, the voice output unit 190 outputs a destination in the form of a voice and then outputs a message in the form of a voice. The content of the message changes for every transmission. In this way, the operator will not become accustomed to the message and will pay attention to the destination. This can prevent an erroneous transmission.

3. Third Embodiment

In the third embodiment, the points different from the second embodiment will be mainly described, and the description of the common parts will be omitted.

3.1 Functional Configuration

An information processing apparatus 2 according to the third embodiment has the same functional configuration as the information processing apparatus 2 according to the second embodiment. Specifically, in the third embodiment, the message determiner 104 counts items based on transmission intervals, and the collected information table 116 illustrated in FIG. 11 is created.

3.2 Process Flow

In the third embodiment, the process flow is the same as that in the second embodiment. In step S1040 in FIG. 7, the message determiner 104 performs a counting process based on the transmission intervals in order to count items based on the transmission date and time. The message determiner 104 then creates a collected information table 116, such as that illustrated in FIG. 11.

FIG. 11 illustrates a collected information table 116 created by the message determiner 104 in step S1040 in the third embodiment. The collected information table 116 collects the result of the counting the content of the history information table 114 in FIG. 8 on the basis of transmission intervals. As illustrated in FIG. 8, the current time is "2018/3/19 13:43" and the time of the previous transmission "2018/3/16 13:10". Thus, the difference between the current time and the time of the previous transmission is three days and 33 minutes. The difference is rounded to three days and stored in the collected information table 116 in FIG. 11. The time of the second-to-last transmission is "2018/3/16 13:10" and the time of the last transmission is "2018/3/16, 8:30". Thus, the difference between these transmissions is four hours 40 minutes, which is recorded as four hours.

The message determiner 104 retrieves the message table 118 illustrated in FIG. 12 in step S1060. The message selected by the message determiner 104 in step S1080 on the basis of the collected information table 116 in FIG. 11 is a message such as that in the message table 118 in FIG. 12. The latest message is based on three days, which is the time difference between the current time and the time of the previous transmission.

The message determiner 104 according to the third embodiment creates a message based on the transmission intervals. The message based on the transmission intervals basically includes a content based on the transmission interval between the latest or current transmission about to be performed and the last transmission. If the message includes a content based on the transmission interval between the last transmission and the second-to-last transmission without including a content based on the transmission interval between the current transmission and the last transmission, the operator will not able to understand the intention of the message.

The message determiner 104 selects the message on the basis of the transmission interval between the current time and time of the last transmission (three days) in the collected information table 116 of FIG. 11. The message determiner 104 selects the message "It has been three days since the last transmission" in the message table 118 in FIG. 12 only on the basis of the time difference between the current time and the time of last transmission.

In specific, the message determiner 104 stores a template "It has been XX days since the last transmission" in advance and uses the template to prepare the message by substituting "XX" with "three", which corresponds to a transmission interval in the collected information table 116 in FIG. 11.

It can be expected that the transmission intervals vary to a certain degree unless, for example, a specific destination is contacted every day at a fixed time. Therefore, it can be assumed that the content of the message determined in step S1080 will be different from the content of the last several messages even when the message is created by simply using a template as described above.

The message determiner 104 may determine the content of the message to be, for example, a comparison of the latest transmission interval with the last transmission interval or the usual trend of transmission intervals. The message determiner 104 selects the message "This is the first transmission in three days" on the basis of the trend of the time differences among the past several transmissions.

The transmission intervals before the transmission interval between the current time and the time of the last transmission in the collected information table 116 in FIG. 11 are less than one day. Despite this trend, the transmission interval between the current time and the time of the last transmission is three days, which is unusually long. Therefore, the message determiner 104 selects the message "The first transmission in three days". If the transmission intervals before the transmission interval between the current time and the time of the last transmission are usually one week or more, the message determiner 104 will not select the message "The first transmission in three days". Furthermore, even when the transmission interval is three days, which is unusually long, the message determiner 104 may select a message different from the above message if the transmission interval includes Saturday and Sunday, which are non-business days.

Therefore, in step S1080, the content of the message can be further changed depending on how many transmission intervals older than the transmission interval between the latest time and the time of the previous transmission are to be taken into consideration for comparison. Note that, the message determiner 104 executes more advanced processing to determine the message "It is the first transmission in three days" than the message "It has been three days since the last transmission".

In the third embodiment, the advance processing executed by the message determiner 104 to determine a message may instead, for example, be executed locally at the controller 100 of the information processing apparatus 2 or by artificial intelligence via a server on a network. The third embodiment may be used in combination with the second embodiment at random timings or timings of characteristic conditions.

4. Fourth Embodiment

In the fourth embodiment, the points different from the second the third embodiments will be mainly described, and the description of the common parts will be omitted.

4.1 Functional Configuration

Figure 13:
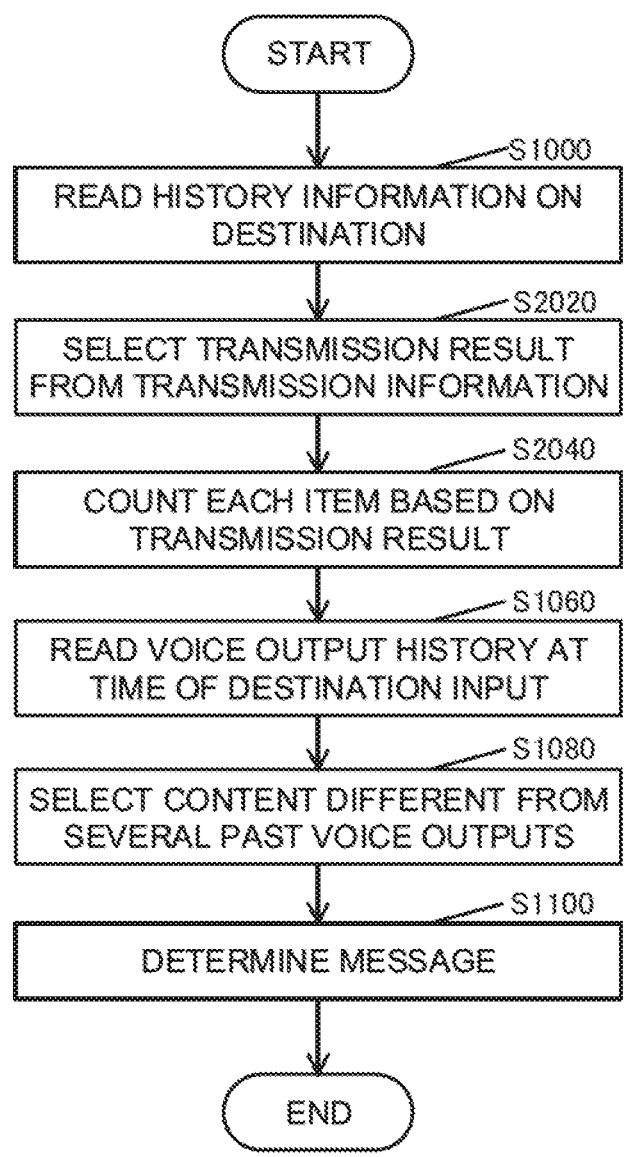
FIG. 13 is a flowchart illustrating a process by the information processing apparatus 2 according to a fourth embodiment.

An information processing apparatus 2 according to the fourth embodiment may have the functional configuration as that of the information processing apparatus 2 according to the second or third embodiment. Specifically, in the fourth embodiment, the message determiner 104 counts items based on communication status. The process flow is illustrated in FIG. 13. The collected information table 116 illustrated in FIG. 14.

4.2 Process Flow

The message determiner 104 according to the fourth embodiment determines a message through the process illustrated in FIG. 13. As illustrated in FIG. 13, the message determiner 104 reads the transmission date and time and the transmission results from retrieved history information, as illustrated in FIG. 8 (step S2020). The message determiner 104 performs a counting process to count items on the basis of the transmission date and time and the transmission result (step S2040) and prepares the collected information table 116, such as that illustrated in FIG. 14. The collected information table 116 in FIG. 14 stores to total number of transmissions within predetermined periods from the transmission date and time counted by the message determiner 104, and further stores the transmission results. Specifically, the predetermined periods are "yesterday," "this week," etc. The respective number of times of normal completion, busy line, and interruption are counted.

As a result, the message determined by the message determiner 104 in step S1080 may be one of the messages in the message table 118 illustrated in FIG. 15.

In the fourth embodiment, the advance processing executed by the message determiner 104 to determine a message may instead, for example, be executed locally at the controller 100 of the information processing apparatus 2 or by artificial intelligence via a server on a network.

4.3 Advantageous Effects

In addition to preventing erroneous transmission by the operator, it is possible to call attention to incomplete transmission by notifying the operator about the quality of the communication status in an objective manner.

In the second to fourth embodiments, the voice output unit 190 may output a voice message. As a result, the operator may notice that the destination has been erroneously input and cancel the previous operations. In the case of such cancellation, there will be a difference between the history of the voice output messages remaining in the message table 118 and the transmission history remaining in the history information table 114. The controller 100 may delete the history of the message and correct the difference. Alternatively, the history manager 113 may store the cancellation in the history information table 114 as an error and correct the difference.

In the above embodiment, the information processing apparatus 1 or 2 includes the controller 100, the memory 110, the display 160, the operating unit 180, the communication unit 170, and the voice output unit 190. It is obvious that the information processing apparatus according to an embodiment of the present invention may have another configuration. For example, the information processing apparatus may be a system that outputs a voice message to a user through use of a voice output function of a terminal connected to a LAN as a voice output unit 190 and connecting this voice output unit 190 to a control computer.

Although the above-described embodiments have portions described separately for convenience of explanation, it is needless to say that they may be implemented in combination within the technically possible range.

As described above, the embodiments described in this specification can be executed in combination within a consistent range.

In an embodiment, a program that operates in each apparatus is a program that controls the CPU or the like (a program that causes a computer to function) so as to realize the functions of the above-described embodiments. The information handled by these apparatuses is temporarily stored in a temporary storage device (for example, a random-access memory (RAM)) during processing, and then stored in various read-only memories (ROMs), and storage devices, such as HDDs or SSDs. The information is retrieved, modified, and written by the CPUs as needed.

As described above, the present invention is not limited to the above-described embodiments, and various modifications can be made within the scope indicated in the claims. It is apparent to a person having ordinary skill in the art that various modifications or corrections may be made within the scope of the appended claims, that is, embodiments obtained by combining various modifications of the technical means within the scope of the present invention are also included in the scope of the invention.

DESCRIPTION OF REFERENCE NUMERALS

1: Information processing apparatus
100: Controller
102: Determiner
110: Memory
112: Destination information table
114: History information table

What is claimed is:

1. An information processing apparatus comprising:
a memory that stores destination information including a plurality of pieces of information as a voice output candidate related to a name;
a determiner that determines a receiver based on the destination information; and
a voice output unit that outputs a voice,
wherein, when the receiver is determined by the determiner,
the voice output unit outputs a voice based on the information related to a name of the receiver, and
wherein the voice output unit randomly selects and outputs the voice based on the information related to the name corresponding to the receiver.

2. The information processing apparatus according to claim 1, further comprising:
a history manager that stores history information including information regarding transmission for each receiver determined by the determiner,
wherein the voice output unit outputs a voice based on the history information.

3. The information processing apparatus according to claim 2, wherein the voice output unit outputs a voice based on information regarding transmission other than the information regarding transmission output in a latest transmission.

4. The information processing apparatus according to claim 3, wherein the information regarding transmission is information regarding a transmission date and time and/or a transmission status.

5. The information processing apparatus according to claim 4, wherein the information regarding the transmission date and time is information regarding a number of transmissions during a predetermined period or information regarding intervals of the transmission date and time.

6. The information processing apparatus according to claim 1, wherein the information related to a name contains at least a destination name and a destination description.

7. The information processing apparatus according to claim 6, wherein in the case where the voice output unit selects the voice based on the destination description, the voice output unit outputs the voice based on the destination name and then outputs the voice based on the destination description.

8. The information processing apparatus according to claim 1, wherein the voice output unit outputs the voice based on the information related to the name of the receiver and then outputs a voice based on numbers of transmissions to the destination in predetermined periods.

9. The information processing apparatus according to claim 1, wherein the voice output unit outputs the voice based on the information related to the name of the receiver and then outputs a voice based on an interval between the latest or current transmission about to be performed and the last transmission.

10. A method of controlling an information processing apparatus, comprising:
determining a receiver based on destination information including information related to a name;
selecting randomly a voice based on the information related to a name corresponding to the receiver when the receiver is determined; and
outputting the selected voice.

11. A non-transitory computer-readable medium that stores therein a program for operating an image forming apparatus, the program causing a computer of the image forming apparatus to execute a process comprising:
determining a receiver based on destination information including information related to a name;
selecting randomly a voice based on the information related to a name corresponding to the receiver when the receiver is determined; and
outputting the selected voice.

* * * * *